Patented Dec. 12, 1939

2,183,237

UNITED STATES PATENT OFFICE 2,183,237

CHROMABLE DYESTUFFS OF THE TRIARYL-METHANE SERIES

Wilhelm Eckert and Karl Schilling, Frankfort-on-the-Main-Hochst, Germany, assignors to General Aniline Works, Inc., New York, N. Y., a corporation of Delaware No Drawing. Application April 22, 1938, Serial No. 203,678. In Germany May 3, 1937

4 Claims. (Cl. 260—335)

The present invention relates to chromable dyestuffs of the triarylmethane series.

Similar products are described and claimed in our co-pending U. S. application Serial No. 197,372 filed March 22, 1938, for "Chromable dyestuffs of the triarylmethane series and process of preparing them."

We have found that very clear dyestuffs of the triarylmethane series, capable of being chromed, are obtained by condensing a 2'.4'-dihydroxybenzoyl-ortho-benzoic acid containing in para- or meta- position to the carboxyl group a further carboxyl group and in ortho-position to that a hydroxyl group, such as for instance, a benzoyl benzoic acid of one of the following constitutions:

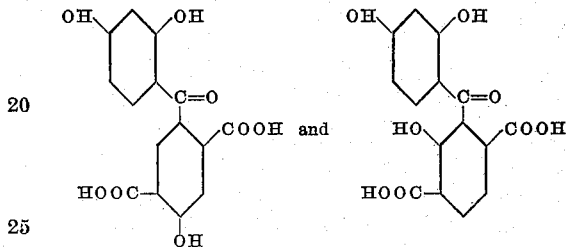

or the substitution products thereof, such as for instance the halogenation products or the mixtures of isomers thereof with an aromatic hydroxyl compound containing in meta-position to the hydroxyl group a substituted amino group and in para- position to that a reactive nuclear hydrogen atom such as is described, for instance, in U. S. Patent 2,153,059 (Serial No. 127,312, filed February 23, 1937) in the name of Wilhelm Eckert and Karl Schilling. The condensation may, for instance, be performed by melting the reaction components at a temperature between about 150° C. and 200° C. The condensation may also be conducted in boiling acetic anhydride which acts as diluent or solvent and at the same time as condensing agent. There may also be used a condensing agent such as, for instance, concentrated sulfuric acid or para-toluene sulfonic acid; a lower reaction temperature of about 70° C. to 140° C. may then be applied. The products thus obtained may be halogenated.

The benzoyl-benzoic acids used as parent materials may, for instance, be obtained, by condensing, at about 130° C. to 150° C., 5-hydroxy- or 3-hydroxybenzene-1.2.4-tricarboxylic acid or the anhydride thereof with a meta-dihydroxy-compound containing a reactive nuclear hydrogen atom, the components under these conditions reacting, for the main part, in the proportion of one mol to one mol; or they may be obtained by treating, for about one hour and at about 150° C., with a caustic soda solution of about 80 per cent. strength, the triarylmethane derivatives obtainable by condensation of the components at an elevated temperature.

The benzoyl-benzoic acids thus obtained probably have the formulae above indicated. There only exists the possibility that they have an isomeric constitution according to the following formulae:

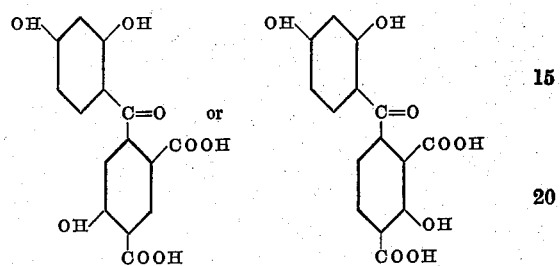

The new dyestuffs dye animal fiber in an acid bath very clear tints. By after-chroming, the properties of fastness of the dyeings are essentially improved. The dyestuffs are also very suitable for chrome-printing on vegetable fiber, such as cotton, artificial silk or the like. The dyestuffs may also be chromed in substance whereby they are transformed into the corresponding chromium complex compounds which dye the fiber from an acid bath very clear shades which possess without afterchroming good fastness properties.

The following examples serve to illustrate the invention, but they are not intended to limit it thereto; the parts are by weight:

(1) 127 parts of 2'.4'-dihydroxy-2-benzoyl-(ortho-hydroxy-carboxy)-1-benzoic acid (obtainable by condensing, at about 140° C., 5-hydroxybenzene-1.2.4-tricarboxylic acid or the anhydride thereof with resorcinol or by treating, at about 150° C., the dyestuff of Example 1 of our co-pending U. S. Patent 2,133,780 (Serial No. 131,936, filed March 19, 1937) with a caustic soda solution of about 70 to 80 per cent strength until a test portion dissolves in water only to a faintly yellow solution) are heated for 5 to 6 hours at 120° C. to 125° C. together with 70 parts of meta-diethylamino-phenol in 150 parts of sulfuric acid of 60° Bé. After cooling the red solution is poured into 300 parts of water, the yellow dyestuff which has separated is filtered with suction and washed with water until neutral to Congo.

The dyestuff is purified by dissolving it in a dilute sodium carbonate solution, filtering and adding dilute hydrochloric acid to the orange-yellow solution until the reaction is acid to litmus. After filtering with suction, washing and drying, the dyestuff is obtained as an orange-yellow powder which dissolves in a sodium bicarbonate solution to an orange-yellow solution having a feebly green fluorescence; by addition of caustic soda solution the color is deepened and the fluorescence disappears.

The dyestuff dissolves in concentrated sulfuric acid to a red, in alcohol to a yellow solution. It dyes wool in an acid bath orange yellow tints. By after-chroming the tint becomes deeper and the fastness of the dyeing is improved.

(2) 64 parts of 2'.4'-dihydroxy-2-benzoyl-(ortho-hydroxy-carboxy)-1-benzoic acid (cf. Example 1) and 33 parts of meta-diethylaminophenol are dissolved in 200 parts of hot acetic anhydride and the solution is heated to boiling for about 2 hours under reflux. The acetic anhydride in excess is then decomposed by adding water, cautiously and slowly to the hot reaction mixture and the dissolved dyestuff is precipitated by addition of a large quantity of water. The dyestuff is filtered with suction and heated on the water-bath with an excess of dilute caustic soda solution of about 5 per cent. strength, until it has completely dissolved. The whole is then further heated for one hour and the red dyestuff is precipitated from the red solution by adding thereto dilute hydrochloric acid until the reaction is acid to litmus. The dyestuff probably has the following formula:

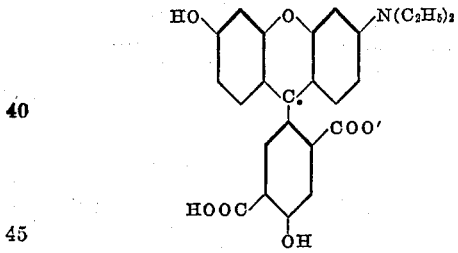

Washed and dried, the dyestuff is a red powder which dissolves in concentrated sulfuric acid to a purely yellow solution. It dyes wool in an acid bath bright red tints which become on after-chroming somewhat darker and much faster.

(3) 50 parts of 2'.4'-dihydroxy-2-benzoyl-(ortho-hydroxy-carboxy)-1-benzoic acid (cf. Example 1) and 25 parts of meta-diethylaminophenol are intimately triturated and the mixture is heated, while stirring, for about 5 hours at 180° C.

At ordinary temperature the pulverized melt is treated with a dilute sodium carbonate solution, the red solution obtained is filtered and the red dyestuff is precipitated from the solution by addition of dilute acetic acid until the solution spreads on filter paper with a pale pink coloration. After filtering with suction, washing and drying, a red powder is obtained which dissolves in concentrated sulfuric acid to a yellow solution and dyes wool in an acid bath in a manner similar to that described in Example 2.

(4) 127 parts of 2'.4'-dihydroxy-2-benzoyl-(ortho-hydroxy-carboxy)-1-benzoic acid (cf. Example 1) and 60 parts of 2-ethyl-amino-4-hydroxy-toluene are together heated to 120° C. in 150 parts of sulfuric acid of 60° Bé. The whole dissolves gradually to a red solution. After about 5 hours the solution is allowed to cool and then poured into about 300 parts of water. A yellow precipitate separates which is filtered with suction, washed and dissolved in a dilute sodium carbonate solution. The orange-red solution which has, if necessary, been filtered, is acidified by means of dilute acetic acid, whereupon the dyestuff separates in the form of yellow flakes. When dry, the dyestuff is a yellow powder which dissolves in concentrated sulfuric acid to a red-yellow and in alcohol to a yellow solution.

It dyes wool in an acid bath tints similar to those of the dyestuff of Example 1. By after-chroming, the tint becomes somewhat brownish and the fastness properties of the dyeing are essentially improved.

(5) 127 parts of 2'.4'-dihydroxy-2-benzoyl-(ortho-hydroxy-carboxy)-1-benzoic acid (cf. Example 1) and 68 parts of N-3'-hydroxy-phenol-piperidine are dissolved in 300 parts of hot acetic anhydride and the solution is heated to boiling for 2 hours. The acetic anhydride in excess is then decomposed, while hot, by cautious addition of a small amount of water and the dyestuff is precipitated in the form of a soft mass by addition of a large quantity of water. The liquor above the mass is decanted and the precipitate is dissolved by heating it on the water bath with an excess of a caustic soda solution of about 5 per cent. strength. After several hours' heating the dyestuff is precipitated by adding to the red solution dilute hydrochloric acid until the reaction is acid to litmus. The dyestuff is filtered with suction, washed and dissolved in dilute sodium carbonate solution, the solution is filtered, if desired, and the dyestuff is isolated by acidifying with dilute hydrochloric acid. It is a red powder which dissolves in concentrated sulfuric acid to a purely yellow solution. The dyestuff dyes wool in an acid bath bright red tints. By after-chroming the dyeings become somewhat darker and much faster.

(6) 49 parts of 2'.4'-dihydroxy-3'.5'-dibromo-2-benzoyl-(ortho-hydroxy-carboxy)-1-benzoic acid (obtainable from the benzoyl-benzoic acid used as starting material in Example 1 by brominating it in alcohol with the necessary quantity of bromine) and 17 parts of meta-diethylaminophenol are heated for about 2 hours to boiling with 100 parts of acetic anhydride. The acetic anhydride is then decomposed by gradually adding water or by distillation. The whole is made alkaline by addition of caustic soda solution, heated on a steam bath until all the solid matter has dissolved and the solution no longer changes its color. The dyestuff is separated by acidifying with mineral acids, washed, transformed in known manner into the sodium salt and dried. The dyestuff probably has the following constitution:

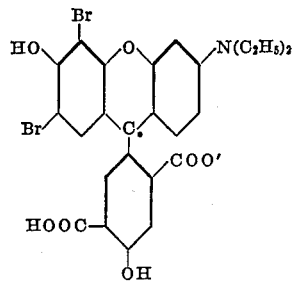

It is a red powder and dyes the animal fiber in an acid bath very clear bluish-red tints. On after-chroming the properties of fastness are considerably improved.

We claim:
1. The compounds of the general formula:

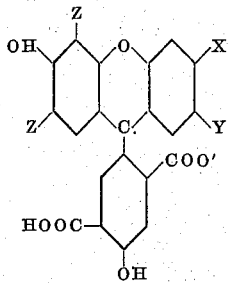

wherein X represents an ethyl substituted amino group, Y a member of the group consisting of hydrogen and methyl, Z a member of the group consisting of hydrogen and bromine.

2. The compound of the formula:

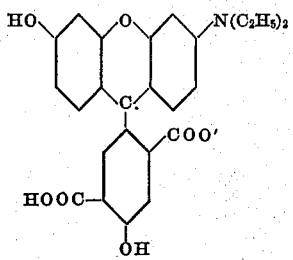

being a red powder, dissolving in concentrated sulfuric acid to a purely yellow solution, dyeing wool in an acid bath bright red tints which become on after-chroming somewhat darker and much faster.

3. The compound of the formula:

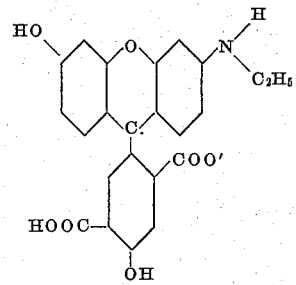

being a yellow powder, dissolving in concentrated sulfuric acid to a red-yellow solution, dyeing wool in an acid bath orange-yellow tints which on after-chroming become somewhat brownish and much faster.

4. The compound of the formula:

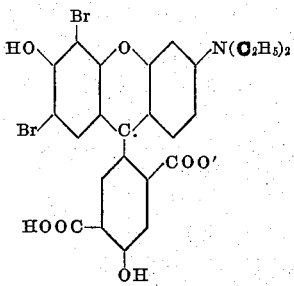

being a red powder, dyeing the animal fiber in an acid bath very clear bluish-red tints, the properties of fastness of which, on after-chroming, are essentially improved.

WILHELM ECKERT.
KARL SCHILLING.